Figure 6:
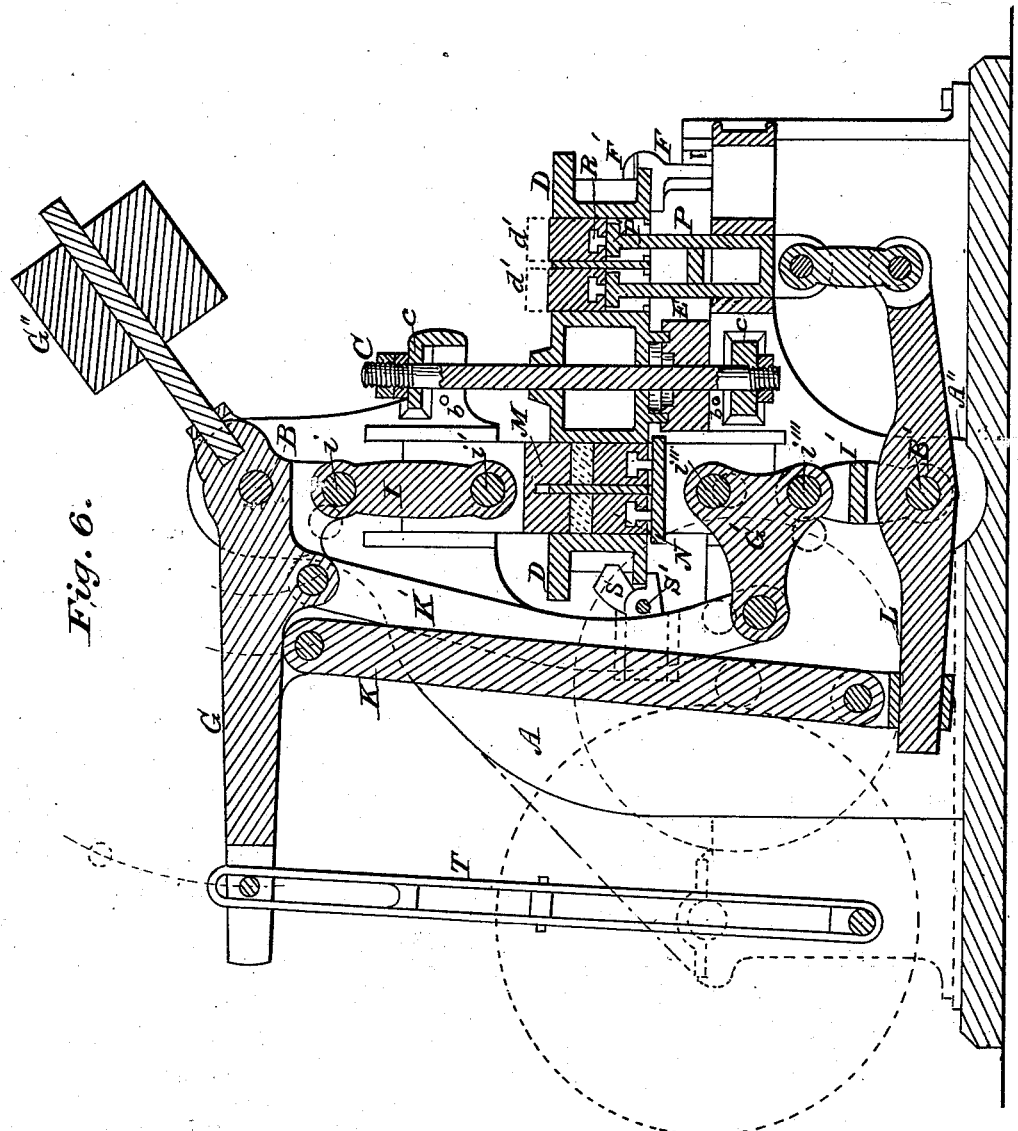

(No Model.) 2 Sheets—Sheet 1.
L. B. KENNEDY.
BRICK MACHINE.
No. 280,316. Patented June 26, 1883.
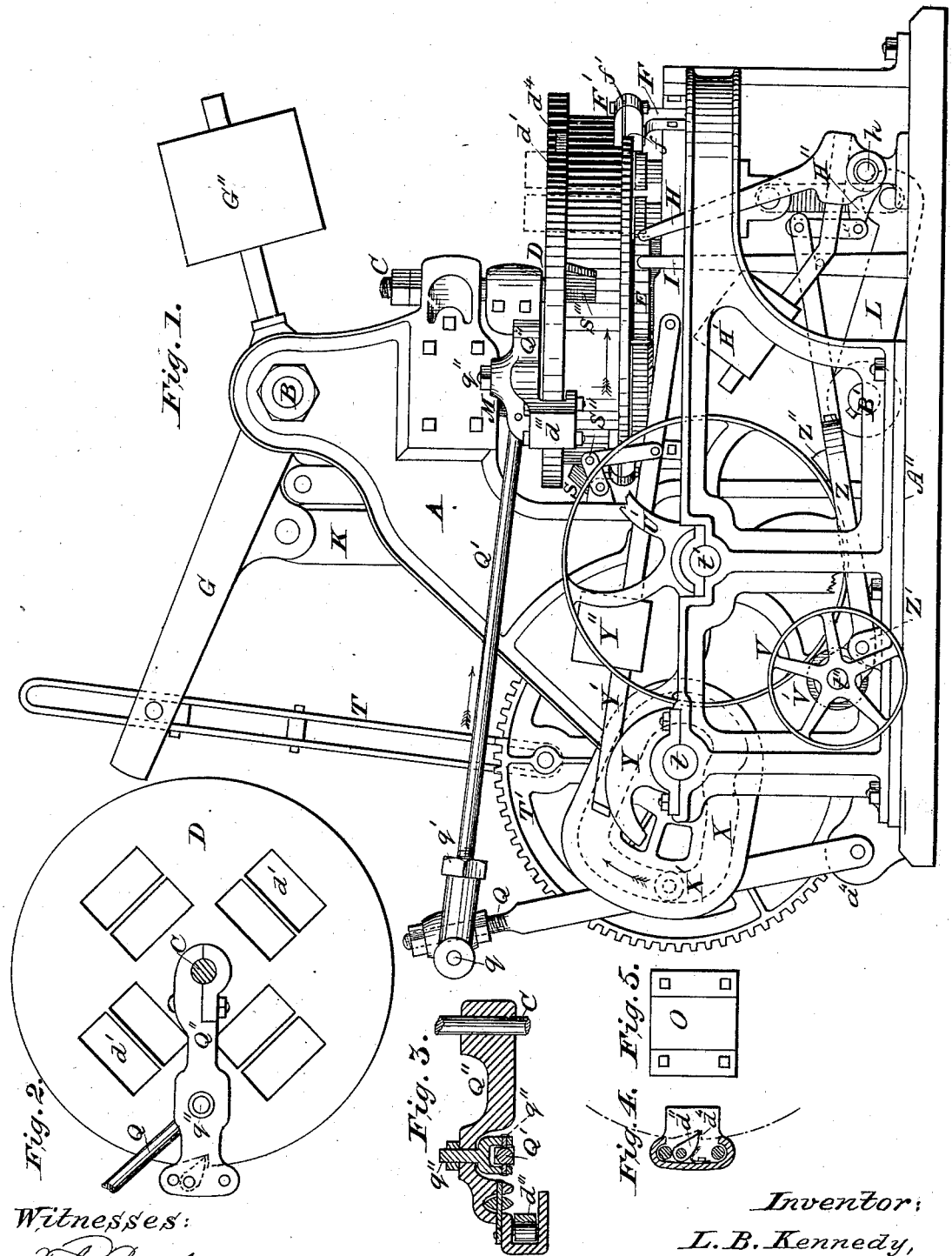
Witnesses:
T. C. Brecht
O. Marchese
Inventor:
L. B. Kennedy,
By Saml. J. Wallace,
Attorney.

(No Model.) 2 Sheets—Sheet 2.

L. B. KENNEDY.
BRICK MACHINE.

No. 280,316. Patented June 26, 1883.

Witnesses:
T. C. Brecht
L. F. Keleher

Inventor:
L. B. Kennedy,
By Saml. J. Wallace,
Attorney.

UNITED STATES PATENT OFFICE.

LEWIS B. KENNEDY, OF KEOKUK, IOWA.

BRICK-MACHINE.

SPECIFICATION forming part of Letters Patent No. 280,316, dated June 26, 1883.

Application filed May 11, 1883. (No model.)

*To all whom it may concern:*

Be it known that I, LEWIS B. KENNEDY, a citizen of the United States, residing at Keokuk, in the county of Lee and State of Iowa, have invented certain new and useful Improvements in Brick-Machines, of which the following is a specification, reference being had therein to the accompanying drawings.

This invention is an improvement upon my brick-machine patented November 14, 1882, for forming brick from nearly dry pulverized clay by great compression in molds, as set forth in said patent, to which reference is made for further explanation of the several parts which correspond with those shown therein. The improvements in which the invention consists are made and used substantially as set forth hereinafter, and as shown in the accompanying drawings, in which—

Figure 1 is an elevation of the machine. Fig. 2 is a top view of the mold-table and the lever for turning it. Fig. 3 is a vertical section of this lever. Fig. 4 is a detail of part of the same. Fig. 5 is a detail of slide-guide in frame A. Fig. 6 is a vertical central section with the main wheel turned half round from the position shown in Fig. 1.

The drive-belt runs on wheel V on shaft $t''$, which is mounted in a forked lever, Z, pivoted at Z', and bears friction-wheel V' between the forks of lever Z, Fig. 1, so as to engage with wheel U', to drive the machine when the opposite end of the lever is held down by weight H', and so that the wheel V' will be released from wheel U', to stop the machine when the lever H is drawn back into the position shown to raise the lever Z. When the lever Z is raised, as in Fig. 1, the wheel V' is released from wheel U', and the friction-shoe Z'', borne on the lever, is pressed against wheel U', so as to stop the machine. The free end of lever Z is held by a link-bar, $h'$, to the end of arm H''' on the shaft $h$, so that when the handle H is drawn back, as shown in Fig. 1, it will raise the end of lever Z, as shown. The shaft $h$ bears an arm bearing weight H', arranged so that when the lever Z is released from the position shown the weight will cause this lever to move down to bring the wheel V' against wheel U', to start the machine, and so the weight will hold these wheels together by a regular pressure. This pressure is adjusted by varying the weight or by varying its distance from shaft $h$, to enable any desired force to be exerted on the machine, and the arrangement prevents too great pressure being given in the machine to endanger breaking it.

Spring-bar I bears a catch to hold up lever Z, as shown in Fig. 1, when the machine is to be stopped while the belt is running. When it is desired to start the machine, the bar I is pushed toward the machine to release this catch and let the weight H' act to start the machine, as before stated. These arrangements enable the machine to be instantly started or stopped, and enable it to be left and held in either state without danger of injury.

Besides the saddle E, containing its annular channel-bearing for the mold-table D, (as set forth in previous patent referred to,) this table has four supports, F, at its outer edge, (not all shown,) two on the sides near the upright parts of frame A, to which they are held, and two on the opposite sides, also held to the main frame. These are made, as shown in Fig. 1, with standards F, held to the main frame and forming supports for the table, to hold it level, and outer bearings, $f$, to hold against the edge of the table and keep it in true position horizontally. They also have top bearings, F', and packings $f'$. The bearings F' hold the table down true, and the packings $f'$ serve to adjust the fit upon the edge of the table, so as to hold the table true and to avoid binding. The edge of the table projects to engage with these parts. Friction-rollers can be used instead of the bearings, and the saddle-bearings may be dispensed with, if desired.

Lever Q is pivoted to a projection from the main frame at $a^4$, and bears a friction-roller projecting at X', arranged to engage with a channel in cam X (shown in dotted lines in Fig. 1) on drive-shaft $t$, so that when the wheel T' on the same shaft turns, the lever Q will be moved back and forth. The upper end of lever Q bears a block, arranged to turn on it as a pivot, and held by a ring on each side in an adjustable position by set-screws in the rings. On this block is held, by a horizontal pivot, $q$, the forked head of thrust-bar Q'. This head has the bar Q' screwed into it, so that its length can be adjusted by screwing in or out of the head, and a jam-nut, $q'$, is used to hold it firmly in place as adjusted. The thrust-bar Q' moves back and forth with lever Q, and moves table-lever Q'', to which it is held by a link or universal-joint connection, q''. This joint has a vertical and a horizontal pivot arranged to permit the two motions of the thrust-bar in relation to the lever Q''. The lever Q'' is pivoted on bolt C in the center of the table D, and engages with its outer edge, as shown in Figs. 2 and 4, by means of a ratchet-catch, $d^3$, pivoted and held by a spring so as to fall into notches $d^4$ in the edge of the table, as shown, and turn the table D part way round at each thrust motion of thrust-bar Q'.

Lever Y' is pivoted to the main frame at one end, and engages at the other with cam Y on shaft $t$, so as to be lifted and dropped by that as it turns. The lever bears weight Y'', to cause it to force lock S into a cavity, S''', in the table D, when the table turns sufficiently. The lever S'' is connected by a link-bar with lever Y, so as to be operated by that. The lock S is mounted on a rock-shaft held in the main frame or a projection therefrom, and is arranged to engage with one of a series of notches, S''', in the edge of the table, when that turns, so as to reach it, to stop the table and hold it solid and true for the plungers to enter the molds. When the cam Y turns, it pushes the lever Y' up and turns the rock-shaft, so as to turn the lock S out of its notch to free the table. The notches S''' are made square on one side, so as to stop the table true, and the other side is inclined, as in Fig. 1, so the lock can wedge down solid into it.

Several of the parts used in this invention can be varied or modified in form and arrangement, and I do not confine myself to those herein specially set forth, as it is evident that I may change them in many ways to secure like results.

The parts are arranged so that while wheel T' makes one revolution from the position shown in Fig. 1 they will go through a series of operations in four distinct periods of time.

First. A period while the drive-wheel T' turns from the position shown in Fig. 1 till it brings the pitman T down until the end of the slot in its upper end comes down to the pivot in lever G. During this period the lever G is held stationary, as shown in Fig. 1, by counter-weight G'', with all the plungers out of the molds and stationary. The cam X turns to move the lever Q, thrust-bar Q', and lever Q'' in the direction shown by the arrows, to move the mold-table D one-quarter of a revolution, to bring a pair of molds filled with clay into place under plungers M, and to bring a pair of molds with brick therein to a point over plunger P, to be pushed out by it; and the cam Y on shaft $t$ moves to pass from under and drop lever Y', so as to drop and force lock S into its cavity in the edge of the table D, to lock and hold it solid when the table turns to the proper position therefor.

Second. A period while drive-wheel T' turns to complete half its revolution from the position shown in Fig. 1 into the position shown in Fig. 6, and the pitman draws down lever G into the position shown in Fig. 6. During this period the plungers M are forced down into the molds to compress the brick, as set forth in my former patents, and the plungers P pushed the finished brick out at $d'$ into the position shown in Fig. 6 and in dotted lines in Fig. 1.

Third. A period while the drive-wheel T' turns, so as to bring the lower end of the slot in pitman T up to the pivot in lever G, and all the other parts remain stationary, waiting for the removal of the brick which were pushed out at $d'$.

Fourth. A period while wheel T' turns to complete its revolution to the position shown in Fig. 1, and pushes up lever G, as shown, to withdraw all the plungers from the molds. During this period the cam Y turns to lift lever Y' to the position shown to lift the lock S from its seat in table D, to set it free, as at first.

The cam X is shaped so as to start and stop the table D with a gradual increase and decrease of velocity, to avoid the strains and knocking of sudden action, and preferably of the form shown in dotted lines in Figs. 1 and 6. The levers Q Q'' and bar Q' are drawn back with any gradual motion desired, and the length of the motion is regulated by the screw-head on bar Q', or by raising or lowering the block on lever Q, or by a like means on lever Q''.

The guides O for the plungers M are made on separate plates, as shown in Fig. 5, instead of as parts of the side plates of the main frame A, as heretofore, and seats are made for them in these side plates of the main frame, in which they are fitted and held by bolts, as indicated in Fig. 1, so as to save the trouble of planing up these bearings true upon the heavy frame-plates. The same arrangements are made for each side of the upper and lower plunger-slides, as shown in my previous patent referred to. When the slide-guides become worn too much, these plates can be removed and new ones put in place.

I do not confine myself to the particular features of construction and use set forth, as they may be variously modified.

I claim—

1. The combination of the wheel U' and a friction-wheel, V', mounted in a swinging frame, Z, with the bar I, for holding the wheels U' V' apart, and with means, H', for holding them together and in frictional contact with a graduated pressure, as set forth.

2. The combination of the friction-wheel V', shoe Z'', bar I, weight H', handle H, shaft $h$, and link $h'$, with the wheel U', whereby the machine is readily started and stopped, substantially as set forth.

3. The guides for holding the mold-wheel in position, consisting of the main supports F, secured to the main frame, the top holders, F', and intermediate packings, $f'$, secured to the supports F in such a manner as to embrace the lower flange of the mold-wheel table or frame D, substantially as set forth.

4. The combination of the driving-cam X, the levers Q Q″, and thrust-bar Q′, arranged to move the mold-table D, provided with means for adjusting the distance of the motion given to the table without changing the character of the motion, substantially as set forth.

5. The combination of the driving-cam X, lever Q, and thrust-bar Q′, arranged to move the brick-mold table D, with a means for adjusting and holding the connection of the bar with the lever at different distances from the cam, to vary the distance the table is to be moved.

6. The combination of thrust-bar Q′, arranged to move the brick-mold frame D, and its actuating-lever Q, with means for adjusting or changing the length of the thrust-bar, so as to adjust its action on the frame D, substantially as set forth.

7. The combination of thrust-bar Q′ and lever Q″, arranged to move the brick-mold frame D, with a universal joint between the lever and the thrust-bar, substantially as set forth.

8. The combination of brick-mold frame D with a lock, S, for holding the frame, provided with a weight, Y″, or means of pressure arranged to force the lock into its cavity, and a means for removing it therefrom, substantially as set forth.

9. The combination of removable guide-plate O, for the plunger-slide, with the main frame A, provided with seat and bolts to hold the same.

In testimony whereof I affix my signature in presence of two witnesses.

LEWIS B. KENNEDY.

Witnesses:
SAML. J. WALLACE,
GEO. M. LOCKWOOD.